Dec. 8, 1964  H. P. DENGLER ETAL  3,160,528
PORTABLE POWER PLANT
Filed Nov. 30, 1961  3 Sheets-Sheet 1

Herbert P. Dengler
Herbert H. Vickers  INVENTORS

BY  *Olin B. Johnson*

PATENT ATTORNEY

Dec. 8, 1964  H. P. DENGLER ETAL  3,160,528
PORTABLE POWER PLANT
Filed Nov. 30, 1961  3 Sheets-Sheet 2

Herbert P. Dengler
Herbert H. Vickers  INVENTORS

BY *Olin B. Johnson*

PATENT ATTORNEY

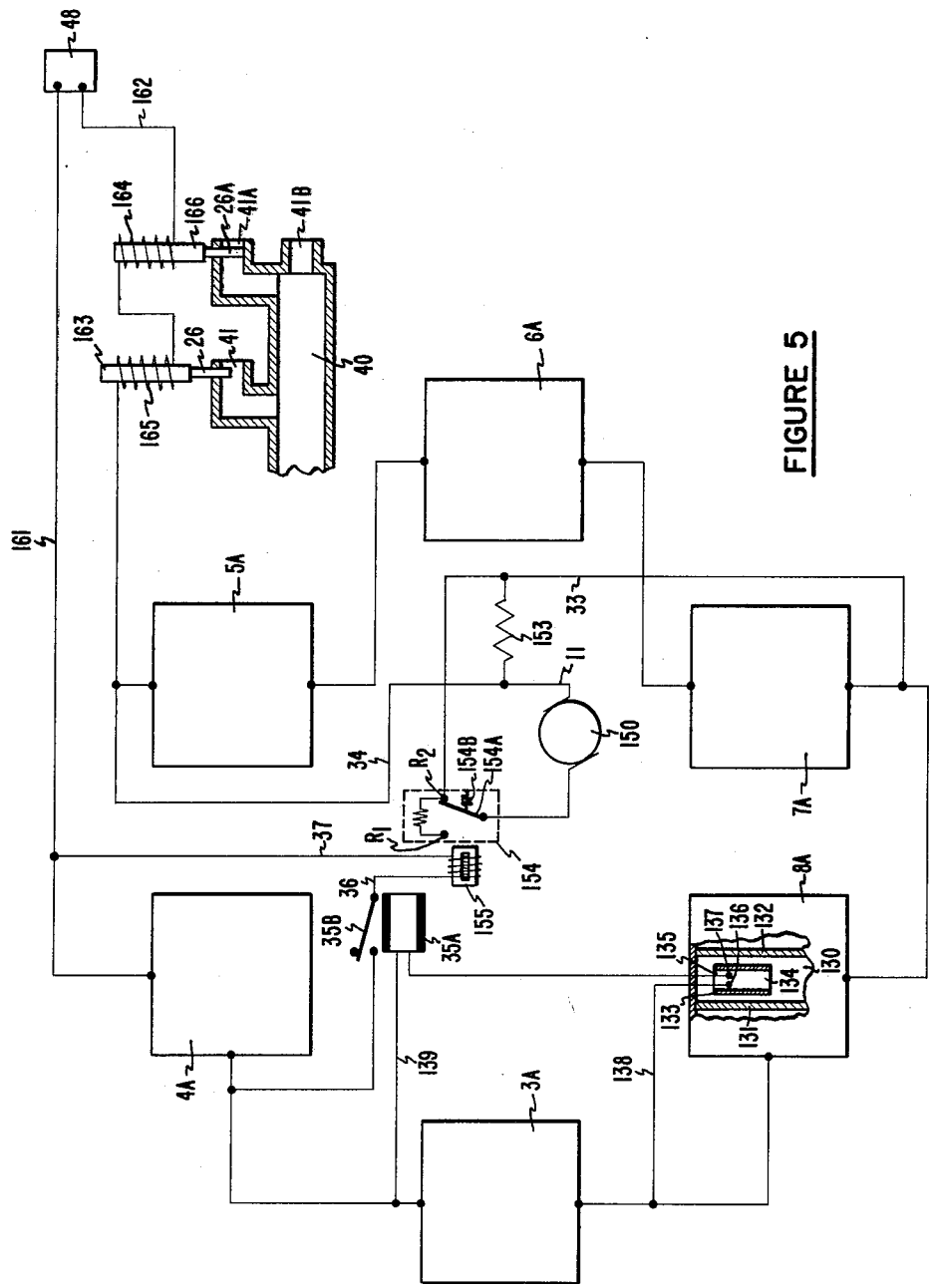

United States Patent Office 3,160,528
Patented Dec. 8, 1964

3,160,528
PORTABLE POWER PLANT
Herbert P. Dengler, Fair Haven, and Herbert H. Vickers, Union, N.J., assignors to Esso Research and Engineering Company, a corporation of Delaware
Filed Nov. 30, 1961, Ser. No. 155,933
1 Claim. (Cl. 136—86)

This invention relates to an apparatus and to a method for controlling the operation of primary power units characterized by the utilization of combinations of fuel cells. In particular, it relates to an air cooled, portable power plant comprising novel apparatus for the assembly, transport and control of fuel cells and to a method for controlling the operating temperature and the water inventory of such cells by a novel method of air control throughout such unit.

Although the power plant of this invention is suitable for general use, it is particularly adapted for providing a source of direct current electric power in areas where the usual sources of electric power are unavailable or inconvenient to use. Hence, the preferred embodiments of this invention comprise a self-contained, compact unit that is easily transportable from place to place.

In fuel cells consuming hydrogen, or the hydrogen constituent of hydrocarbons and other hydrogen containing fuels, wherein electrochemical oxidation is accomplished via pure oxygen or by gases containing free or uncombined oxygen, e.g. atmospheric air, the fuel cell reaction produces substantial quantities of water. The cells of the type used in the power unit of this invention are of the type designed for continuous operation, i.e. fuel and oxidant are made continuously available to the reaction sites of the cell from a source outside the cell. The over-all fuel cell reaction is the sum of two essentially independent half-cell reactions. At the anode of the cell a fluid combustible hydrogen-containing fuel, e.g. hydrogen, hydrocarbons, alcohols, ketones, carboxylic acids, ethers, aldehydes or other hydrogen-bearing substituted hydrocarbon, is electrochemically oxidized with a resulting release of electrons to such anode and the formation of hydrogen ions. At the cell cathode oxygen gas is reduced with the acceptance of electrons from the cathode, passes through various ionic states compatible with the electrolyte medium employed and ultimately combines with hydrogen ion to form water. This water product dilutes and increases the level of aqueous electrolyte in the electrolyte compartment of each cell. Excess water must be removed from the system and the rate of such removal must be controlled in order to maintain the aqueous electrolyte at an effective operating level and concentration.

When oxygen is supplied to the cathode in a mixture of gases, such as air, it becomes necessary that exhaust means be associated with such cathode for the removal of the oxygen diluents in the mixture, e.g. nitrogen, to prevent blocking of the cathodic reaction sites through a build up of other gases. Ordinarily, the oxygen content of the process air will be only partially depleted upon leaving the cell and hence in normal operation an excess of air will be passed through the cell, i.e. in excess of the stoichiometric requirements for the cathodic reaction. The passage of air through the cell, i.e. along and/or within the cathode, provides one means of water removal from the cell. The rate at which water is removed via the air stream is dependent upon electrolyte temperature, water vapor content of the process air upon entering the cell and the rate at which such air is passed through the cell.

One method suggested for controlling electrolyte level by the removal of product water is to increase the flow of air through the cell until the desired water balance is achieved. However, the removal of water predicated solely upon process air rate ignores certain operational variables and will provide numerous impediments to effective power generation. First, the employment of a fixed rate for process air unless integrated with other control means ignores the changes in the rate of water production which is directly proportional to the demands made upon the system for current. Second, an unduly high rate of flow of process air tends to cool the electrolyte resulting in a decrease in the rate of water vaporization into the air stream. Third, an unduly high rate of flow of process air shortens the residence time of air passing through the cell and hence reduces the heat absorption of such air which in turn reduces its capacity for accepting water vapor. Fourth, an unduly low rate of flow of process air while providing a high rate of water removal per unit of passing air can result in an overheating of the system unless integrated with other effective cooling means and may, in any event, provide an oxygen deficient system particularly in times of highest current demand. Fifth, since the water content of the atmosphere varies and such variance affects the rate of water removal, controls based on process air rate would necessitate continuous analysis of the process air and complementary changes in the air rate or the use of more complicated humidification and dehumidification equipment.

In accordance with this invention a relatively constant internal air flow through the cell is maintained for a given current load. The rate of external air flow about the periphery of the cells or cell packs is varied inversely with the water inventory of the electrolyte. The process air is automatically varied in accordance with the current load under which the cells are being operated via a damper upon signal from a current monitoring device. The rate of flow of cooling air is automatically increased or decreased upon signal from an electrolyte level sensor element. Thus, automatic cooling of the electrolyte is provided when the electrolyte level is low thereby decreasing the water loss to process air via vaporization and an automatic brake is provided upon the cooling system when the water inventory is excessive and the unit is self-adjusting to accommodate changes in the humidity and temperature of the atmosphere. This method is effectuated by utilization of a cooling fan driven by a variable speed motor, the speed of which is automatically controlled by an electrolyte level sensor element. In a preferred embodiment the fuel packs containing such cells are positioned within a plant housing about a centrally positioned variable speed fan.

The invention will be more fully understood by referring to the attached drawings wherein:

FIGURE 5 is a schematic view of one embodiment of the electrical circuit connecting the cell packs of the unit with each other and with control means for regulating the unit's cooling system in response to electrolyte level sensing and for regulating process air in accordance with current demands upon the system.

Figures 1, 2:
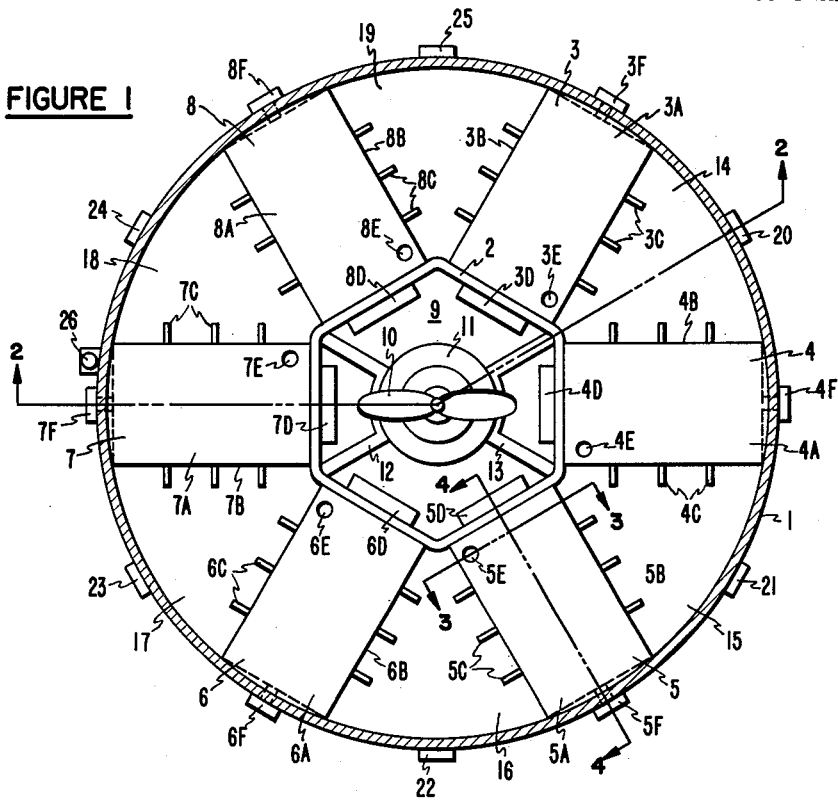
FIGURE 1 is a top view in cross-section of a fuel cell power plant taken along line 1—1 of FIGURE 2.
FIGURE 2 is a side view in cross-section of the power plant of FIGURE 1 taken along line 2—2 of FIGURE 1.
Figure 3:
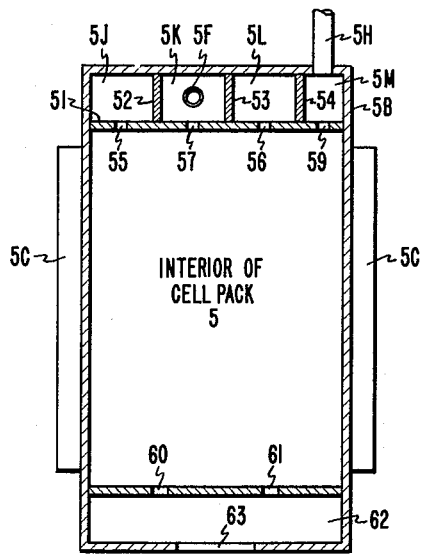
FIGURE 3 is a view in cross-section of one of the fuel cell packs of FIGURE 1 taken along line 3—3 of FIGURE 1.

Referring now particularly to FIGURE 1, a top view along line 1—1 of FIGURE 2, there is shown a vessel or outer housing 1 within which is centrally positioned air conduit or inner housing 2. Inner housing 2, here shown as hexagonal, may be otherwise shaped and constitutes a tube-like structure having two open ends and side walls that envelop a portion of the major vertical axis of outer housing 1. Between inner housing 2 and outer housing 1 are a plurality of fuel cell pack assemblies 3, 4, 5, 6, 7 and 8 arranged radially at equal angular intervals around housing 2. Each of these cell packs, as here shown, comprises a cell pack proper 3A, 4A, 5A, 6A, 7A and 8A and an exterior cell pack housing 3B, 4B, 5B, 6B, 7B and 8B having integrally formed or attached a plurality of cooling fins 3C, 4C, 5C, 6C, 7C and 8C, air directing baffles 3D, 4D, 5D, 6D, 7D and 8D positioned immediately above process air inlet means for each cell pack which are shown in FIGURE 2, fuel inlet means 3E, 4E, 5E, 6E, 7E and 8E and upper product exhaust means 3F, 4F, 5F, 6F, 7F and 8F for the release of carbon dioxide or other product gases from the cell packs. Such cell packs are electrically connected, ordinarily in series, and each contain a number of individual fuel cells which are electrically connected in series and/or parallel along with suitable inlet and outlet means and conduits for adapting such cells for continuous operation. For purposes of illustration, one embodiment of a cell pack which may be used with this invention is hereinafter described in detail with reference to FIGURES 3 and 4. Housing 2 forms central air conduit 9 through which both process air and coolant air is drawn upward by cooling fan 10 driven by a variable speed direct current motor 11 which is supported by bracket members 12 and 13 which are in turn supported by housing 2. In the operation of the power plant apparatus shown in FIGURE 1, air is pulled upward by fan 10 through central air conduit 9 from air inlet means shown in FIGURE 2 near the base of housing 1. A portion of this air stream enters cell packs 3–8 via process air inlet means preferably positioned immediately below baffles 3D–8D. Such inlets, not visible in FIGURE 1, are shown in FIGURES 2 and 3. The remainder of the central air stream passes over and above cell packs 3–8 and is forced downward past cooling fins 3C–8C through coolant zones or channels 14, 15, 16, 17, 18 and 19 to coolant outlet means positioned in outer housing 1 and aligned with dampers 20, 21, 22, 23, 24 and 25 shown in FIGURE 1, or other outlet means shown in FIGURE 2. Process air exhaust damper 26 constitutes a part of the process air control system hereinafter described in greater detail with reference to FIGURES 2, 6 and 7.

Referring now to FIGURE 2, a side view in cross-section taken along line 2—2 of FIGURE 1, there is shown at the top within outer housing 1 a fuel tank 30 formed by outer housing 1 and tank floor 31. Tank floor 31 with inner housing 2, cell packs 3 and 7, and other cell packs shown in FIGURE 1 form an upper coolant zone or manifold 32 through which coolant air from fan 10 circulates over the tops of the cell packs before descending through the coolant channels shown in FIGURE 1 past the cooling fins 3C and their counterparts aforementioned with reference to FIGURE 1. Although line 2—2 of FIGURE 1 passes through the interior of cell pack 7, for purposes of simplicity and orderly description the interior of cell pack 7 labeled but not shown in detail in FIGURE 2, such showing being made hereinafter in FIGURES 3 and 4 with reference to cell pack 5. Below baffle 7D, heretofore mentioned with reference to FIGURE 1 and hereinafter discussed with reference to FIGURE 3, is shown process air inlet means 7G through which process air enters cell pack 7. Between the cell packs and fuel tank 30 are shown fuel conduits 3H, 7H and 8H through which fuel is made continuously available to their respective cell packs, e.g. by gravity feed or pressure storage (or if desired, by pumping means, not shown). Between cell pack assembly 3 and motor 11 there are shown electrical conductors 33 and 34 completing a direct current power circuit between one or more of the aforementioned cell packs and motor 11. Between cell pack assembly 7 and motor 11 are shown relay housing 35, containing relay 35A shown in FIGURE 5 and explained hereinafter in reference thereto, and conductors 36 and 37 completing an electrical circuit whereby the speed of motor 11 and fan 10 is varied upon signal from an electrolyte sensor element in one or more of the aforementioned fuel cell packs. Such element and the electrical circuit associated therewith are discussed in detail with reference to FIGURE 5. Motor 11 is a direct current motor of the variable speed type. The voltage across the armature and the strength of the field determine the speed of a direct current motor. The several methods of wiring employed in variable speed direct current motors are well known in the art as are the advantages and disadvantages of each. The present invention is not limited to the use of any particular one of the conventional systems. Conventionally, the speed of such motors is varied by one of two basic methods, although various modifications and combinations of such arrangements are well known in the art. Thus, the speed of a direct current motor can be changed by employing armature and field windings of constant resistance and changing the voltage supplied to the armature, or by employing with a fixed voltage an adjustable resistance connected in series with either the armature windings or in the alternative, with the field circuit. One such system for employing an adjustable resistance is illustrated in FIGURE 5. Although the motor may be designed for a gradual or multi-step change of speed, a two-speed motor is suitable and, for simplicity of operation, is preferred. Such motors are commercially available in a variety of sizes and find common use in the operation of dual speed fans, windshield wipers, etc.

Figure 4:
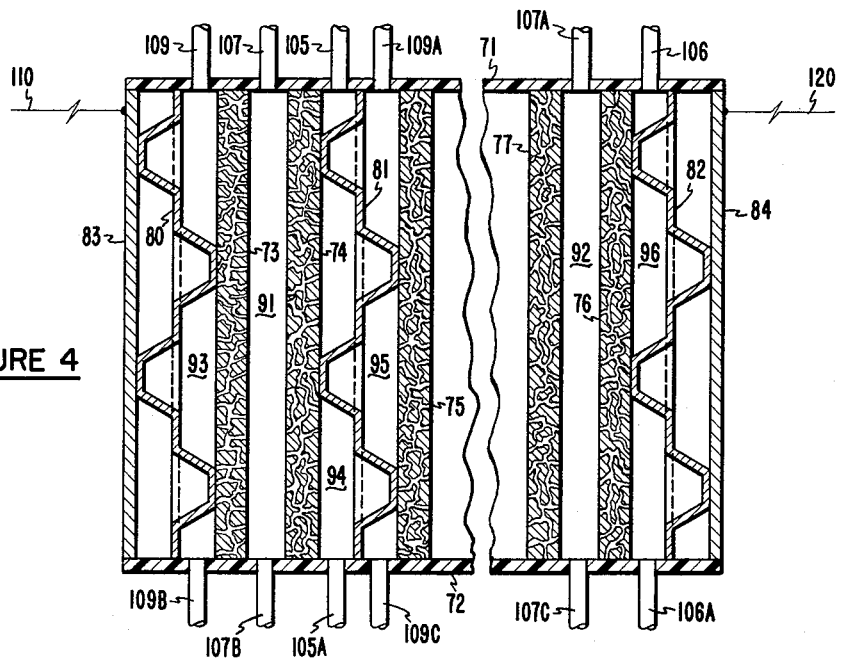
FIGURE 4 is a semi-diagrammatic elevational view in cross-section of one of the fuel cell packs of FIGURE 1 taken along line 4—4 of FIGURE 1.

Process air entering cell pack assembly 7 through inlet means 7G after being forced downward via the pressure generated by fan 10 through the individual cells of cell pack 7A escapes through a plurality of air exhaust conduits, shown in FIGURE 4, into air exhaust duct 38 and thence passes via exhaust conduit 39 into primary air exhaust manifold 40 which receives such exhaust from each of the various cell packs. From process air exhaust manifold 40 the process air exhaust escapes to the atmosphere via process air outlet means 41, an opening in outer housing 1, the size of which is automatically controlled by process air damper 26 which is closed and opened in accordance with the electrical demands upon the system via a control system hereinafter described in greater detail with reference to FIGURE 5.

When fan 10 is operating at low speed, the cooling air stream, after passing downward from zone 32 along cooling fins 3C, reenters central air conduit 9 via coolant conduit 43, an opening in inner housing 2, and is drawn upward by fan 10 along with the incoming fresh air supply from base duct or common air manifold 44 into which atmospheric air is drawn through a plurality of common air inlet means 45 near the bottom of housing 1. The term "common" is used herein in reference to an air stream or an air conduit consisting of or through which passes both process air and coolant air. When fan 10 is operated at low speed, the foregoing comprises the circuitous air path throughout the unit with the coolant air being recirculated until it eventually passes into the cell packs as process air and is discharged as hereinbefore described. However, when additional cooling is required and fan 10 is operating at a higher rate of speed, a sufficient pressure is built up by the coolant air to force open a spring-loaded damper 20 allowing a portion of the coolant air to escape immediately from the system via coolant air exhaust conduit 47, an opening in outer housing 1. Plug 48 represents an external electrical outlet connection through which the energy generated in the power plant can be utilized.

Referring now to FIGURE 3, a partial cross-sectional view of cell pack assembly 5 taken along line 3—3 of FIGURE 1, there is shown the manifolding system providing means of ingress and egress for reactants and products from the cell pack. Again, to avoid duplication in description, the cell pack proper is merely labeled; a discussion of this unit in detail will be made hereinafter with reference to FIGURE 4. Near the top of cell pack assembly 5 is positioned upper manifold base wall 51 which also serves as the top wall of cell pack 5A. The space between wall 51 and the top wall of 5B, the outer covering of the cell pack assembly shown in FIGURE 1, are positioned three vertical partition walls 52, 53 and 54. Walls 51, 52, 53 and 54, together with 5B, form a plurality of ducts or manifolds 5J 5K, 5L and 5M. Process air is distributed to the cell pack via process air manifolds 5J and 5L into which process air enters from central air conduit 9 through an opening in interior housing 2 immediately below air baffle 5D shown in FIGURE 1. Although shown with reference to cell pack assembly 5, this opening corresponds to or connects with process air inlet means 7G shown in FIGURE 2. It should be understood that although two separated air manifolds, i.e. 5J and 5L, are shown in FIGURE 3, the design may be altered to employ either a single manifold or a greater number of such manifolds than is shown in this figure. From manifolds 5J and 5L process air is passed downward to the individual fuel cells of the pack via air conduits 55 and 56. Separated from air manifolds 5J and 5L by walls 52 and 53 is product escape manifold 5K. Carbon dioxide and/or other gases, products from cell pack 5A, enter 5K through conduit 57 and escape from the system via exhaust means 5F, the interior of which is shown here while the exterior view of 5F is shown in FIGURE 1. Separated from manifold 5L by wall 54 is fuel inlet manifold 5M into which fuel from tank 30 of FIGURE 2 is admitted via fuel conduit 5H, thence passed downward to the individual cells of 5A via conduit 59. Conduits 55, 56, 57 and 59 are representative of a plurality of such conduits or openings in base wall 51 along the bottoms of the respective manifolds. The function of manifolds 5J, 5K, 5L and 5M, together with conduits 55, 56, 57 and 59, will be discussed further hereinafter with reference to FIGURE 4. Process air, after passing through cell pack 5A is discharged through a plurality of exhaust conduits represented by conduits 60 and 61 in the bottom or base wall of cell pack 5A into air exhaust duct 62 in FIGURE 2 and thence through conduit 63 into primary air exhaust manifold 40 shown in FIGURE 2.

Referring now to FIGURE 4, there is shown a cutaway portion of fuel cell pack 5A taken along line 4—4 of FIGURE 1 so as to illustrate one embodiment of the organization of individual cells. Between upper supporting wall 71 and lower supporting wall 72 are positioned anodes 73, 75 and 77, cathodes 74 and 76, bipolar conductor plates 80, 81 and 82, and terminal conductors 83 and 84. Retaining walls 71 and 72 are formed of suitable nonconductive material, e.g. hard rubber, polypropylene, or other watertight, electrolyte resistant solid. Walls 71 and 72, together with side walls of similar material, not shown, and electrodes 73, 74, 76 and 77 form electrolyte compartments 91 and 92. Bipolar conductor plates 80, 81 and 82 are formed of a suitable metal, i.e. a good conductor of electricity that is chemically resistant to the electrolyte employed in compartments 91 and 92, such as nickel-steel or other suitable alloys. Plate 81, in addition to its function as a conductor, divides the space between cathode 74 and anode 75 into air feeding channel or zone 94 and fuel feeding channel or zone 95. Other conductor plates, not shown, perform this same function between other internal electrodes, also not shown. Conductor plates 80 and 82, in addition to providing electrical conduction to terminal plates 83 and 84, likewise respectively form fuel feeding zone 93 and air feeding zone 96. Air conduits 105 and 106 communicate with conduits 55 and 56 of FIGURE 3. Gas product conduits 107 and 107A communicate with conduit 57 of FIGURE 3. Fuel conduits 109 and 109A communicate with conduit 59 of FIGURE 3. Conduits 107B and 107C are provided as drainage means for electrolyte compartments 91 and 92, are optional and, when employed in the design, will ordinarily be closed in normal operation. Fuel conduits 109B and 109C may be closed except for purging or cleaning operations or, in the alternative, may be connected with a fuel recycling system, not shown in the drawings. Conduits 105A and 106A are air exhaust conduits and communicate with conduits 60 and 61 of FIGURE 3. Wire leads 110 and 120 represent the beginnings of an external electrical circuit in which each of the cell packs shown in FIGURE 1 are electrically connected. This connection will ordinarily be in series, but combinations of series and parallel connections may be utilized where such arrangement better serves the power requirements to be placed upon the unit. As beforementioned, the construction of the cells employed in the cell packs used herein, the organization of cells within each such pack, and the feed and exhaust conduit organization for each pack are not limited to a specific embodiment of the fuel cell or fuel cell pack. Thus any effective fuel cell utilizing an aqueous electrolyte, a hydrogen-containing fuel and an oxygen gas or air breathing cathode may be employed.

The particular embodiment shown in FIGURE 4 is designed for diffusion feeding of a liquid or gas which enters fuel feed compartments 93 and 95 and forms an interface with electrolyte from electrolyte compartments 91 and 92, either at one face of or, more commonly, wtihin porous anodes 73 and 75. Thus in this embodiment, both cathodes 74 and 76 and anodes 73, 75 and 77 are porous structures or otherwise designed to be permeable by electrolyte and/or the respective feeds of fuel or oxidant admitted thereto. Such electrodes are well known in the art and may be constructed of porous carbon; metal surfaced, porous organic membranes; metal surfaced, fritted glass; etc. Such electrodes are surfaced or otherwise impregnated with suitable anodic and cathodic metal or metal-comprising catalysts to accelerate the rate of reaction of other respective half-cells. Such catalysts also are well known in the art and do not comprise a part of this invention. Metals which have been satisfactorily employed for this purpose include, by way of example, metals of the platinum group, nickel, silver, cobalt molybdate, manganese molybdate, etc., due allowance being made for the chemical nature of the electrolyte employed. It is within the scop eof the invention to utilize cells wherein an electrolyte soluble fuel, e.g. methyl alcohol, is admitted into solution with the electrolyte, in which case the need for a porous anode or fuel electrode is eliminated. Thus in this embodiment, the anode may be nothing more complicated than a catalyst surfaced conductive sheet, e.g. platinum surfaced metal or carbon. Such embodiment further eliminates the need for separate fuel feeding compartments. Likewise, the electrolytes employed in compartments 91 and 92 may be either basic or acidic in nature, e.g. aqueous KOH, $H_2SO_4$, $H_3PO_4$, $HNO_3$, etc. The acidic electrolytes are preferred because of their ability to reject carbon dioxide formed in the electrochemical oxidation of an organic fuel.

Referring now to FIGURE 5 there is shown schematically one embodiment of the electrical circuits that connect the aforedescribed units together with control means utilized in the operation of this invention. Cell packs 3A–8A, also shown in FIGURE 1, are here shown electrically connected in series, such conductors terminating in conductors or wire leads 161 and 162 which in turn terminate at outlet plug 48, also shown in FIGURE 2. In accordance with this invention the rate of flow of process air past the various cathodes in the cell packs is varied in direct proportion to the power production demands upon the system, e.g. by current withdrawal activation of solenoid valves controlled damper means. The change in such flow rate may be constant and immediately responsive or stepwise, as shown here. In this embodiment when electrical energy flows through coil 163 at a predetermined rate, bar 165, e.g. a movable solenoid core, is caused to rise. Damper 26 attached to bar 165 is raised, opening to the atmosphere process air outlet 41 here shown partially open. Upon further increase in the load the current passing through coil 164 causes bar 166 to rise with attached damper 26A so as to open process air outlet 41A. Upon a lessening of the flow through coils 163 and 166 dampers 26 and 26A are returned to a closed position, e.g. by gravity. In this multi-step control embodiment, process air outlet 41B remains open at all operating rates. It is to be understood that other embodiments of the system described may be employed as in FIGURE 2 with a single damper moved to various positions automatically as the current demands upon the system increase or decrease. It is desirable to keep the rate of flow of process air through the cells substantially constant for any particular rate of current production. With the aforedescribed dampering system, little change occurs in process air flow from changes in the speed of fan 10. However, supplementary control may be accomplished by establishing connecting means, not shown, between coolant exhaust damper 20 of FIGURE 2 and process air exhaust damper 26 whereby upon the opening of the coolant exhaust damper at high fan speed the process air exhaust damper is automatically partially closed with corresponding release upon the closing of the coolant exhaust damper.

Further shown are circuits for controlling the speed of motor 11 and fan 10, shown in FIGURES 1 and 2, via employment of electrolyte level sensing means, shown here in cell pack 8A. A portion of cell pack 8A is cut away to show an electrolyte compartment 130 between two opposing electrodes 131 and 132. Within compartment 130 is positioned an electrolyte sensor element of suitable type. The device as shown comprises a tube 133 having an electrolyte inlet 134 at or near the bottom thereof and an outlet 135 at or near the top. Electrical contacts 136 and 137 are placed within tube 133 at a predetermined level. When the upper surface of the electrolyte reaches such level the sensor circuit comprising cell pack 3A, wires 138 and 139, and relay 35A, is completed. When current flows through the sensor circuit, spring-loaded contact 35B closes so as to complete fan control circuit comprising cell pack 4A, wires 36 and 37 and electromagnet 155.

In the embodiment shown, the closing of the fan control circuit reduces the speed of motor 11, and hence of fan 10, shaft driven thereby, by increasing the resistance in series with the armature windings. The motor circuit comprises an armature 150, a field coil 153 and an adjustable resistance 154 electrically connected in series with armature 150. Contact arm 154A is held in a position of lower resistance $R_1$ by spring 154B when the fan control circuit is open. When the fan control circuit is closed, current from cell pack 4A activates electromagnet 155 through wires 36 and 37 and contact arm 154A is thereby moved from the position of lesser resistance $R_1$ to a position of greater resistance $R_2$.

Hence, in this embodiment the opening of relay 35A by a break in the sensor circuit increases the speed of motor 11 and fan 10 from $S_1$ when contact arm 154A is in position $R_2$ to $S_2$ upon the return of such arm to position $R_1$. As aforementioned, this procedure is reversed when the adjustable resistance is placed in series with the motor field.

By employing the electrolyte sensor element and the associated circuit hereinbefore described, the faster rate of water removal is automatically braked when the electrolyte level falls below the level at which the sensor circuit is opened and the speed of the fan is increased to $S_2$, a speed which provides sufficient cooling of the electrolyte to reduce the rate of water removal to a degree such that the rate of water production is in excess of the rate of water removal until the sensor circuit is once again closed.

In one preferred embodiment the design illustrated in the accompanying drawings is employed in the assembly of a portable power unit having six fuel cell packs connected in series. Air cooling is made more feasible by operating at a relatively low current density. In this embodiment seventeen individual fuel cells are in series in each pack. The electrodes are of a size such that the unit provides direct current power at the rate of one kilowatt per hour operating at 82 amperes per square foot (based on superficial anode surface exposed to electrolyte) at 0.84 volt. In this embodiment the fan is driven by a direct current motor of fixed resistance. The fan motor is electrically connected via a first circuit with two cell packs in series which deliver to the armature terminals of the motor a voltage $V_1$. A second circuit is provided which when closed brings one or more other cell packs into series with the first circuit providing a higher voltage, $V_2$. When the unit is placed in operation with the admission of fuel to the anodes or fuel electrodes, e.g. by manually operated valve, the fan control circuit is closed, the motor receives voltage $V_2$ turning the fan at speed $S_2$. Upon the buildup of product water in the electrolyte to a predetermined level, a level-sensor circuit powered by one or more of the cell packs is closed and a relay in the above-mentioned fan control circuit is broken. The voltage to the armature terminals of the motor is thus reduced from $V_2$ to $V_1$ and the speed of the fan from $S_2$ to $S_1$. A decrease in the speed of the fan reduces the rate of flow of coolant air about the cell packs, the temperature of the electrolyte within the cells rise, the rate of water removal from the cells increases and the electrolyte level falls until the level-sensor circuit is broken, releasing the force holding such relay in open position and the said fan control circuit is again closed returning the fan to speed $S_2$.

The rate at which fuel must be electrochemically oxidized to provide a given deliverable current density can be calculated from the electron release per molecule of fuel oxidized making allowance for internal losses from cell inefficiency and external losses in transmission. The amount of water produced in the oxidation of a definite amount of a given fuel is obtainable by routine calculation since the oxygen passing into the electrolyte in ionic form in the cathodic half-cell reaction is equal to the amount utilized in the creation of water product. This unit is therefore designed so that when the fan is operated at its low speed, $S_1$, and the flow of process air is constant, the temperature of the electrolyte will rise in response to the electrochemical oxidation occurring in the cell thereby increasing the vapor pressure of the electrolyte to the degree that the process air will remove water from the cell at a rate greater than the rate of water production. This temperature rise can effectuate the necessary water removal without any appreciable change in process air rate. At $S_2$, however, the fan rate provides sufficient cooling to reduce the water removal rate which becomes less than the water production rate.

It should be understood that the position of the fuel tank and the primary air inlet means may be reversed in relation to the position shown in the drawing so that the common air stream for both process air and coolant air enters at or near the top of the power unit while the fuel tank is positioned at or near the base. This arrangement is particularly applicable where the fuel employed is a gas.

It should be understood that this plan of electrical connection may be modified by one skilled in the art in accordance with the over-all design, size of unit, and intended end use so long as the principles of operation hereinbefore set forth are maintained.

The size of the air-cooled, portable power plants of this invention and correspondingly their rated capacity for power production may be varied in accordance with the intended end use. The power unit designs and the methods for control herein described and illustrated are particularly adapted for units having a power rating in the range of about 0.5 to 3.0 kilowatts/hr.

It is also within the scope of this invention to provide oxidant inlet means to the cathodes of the various cells which are separate and apart from the conduits hereinbefore described for the passage of "process air" along one side of the porous cathode. In this embodiment a fluid oxidant, e.g. oxygen gas, air, hydrogen peroxide, etc., can be admitted into the interior of a hollow cathode, along a surface of the cathode, or directly into the electrolyte near such cathode via such separate inlet means. In this embodiment the "process air stream" of the embodiments hereinbefore described, is retained but is primarily utilized as a sweep gas in contrast to the dual function performed in the heretofore discussed embodiments.

What is claimed is:

A self-contained primary power unit comprising in combination an outer housing, an inner housing centrally positioned within said outer housing and forming a central air conduit, a plurality of electrically connected fuel cells divided into a plurality of fuel cell packs which are positioned in spaced apart relationship between said outer housing and said inner housing so as to admit of the passage of air therebetween, said fuel cells each comprising an anode, a porous cathode and an electrolyte compartment for the retention of an aqueous electrolyte between and communicating with said anode and said cathode, conduction means between said fuel cell packs electrically connecting said packs in series and terminating in an electrical outlet means, unit air inlet means in said outer housing communicating with one end of said central air conduit, a fuel tank within said outer housing and spaced apart from the end of said central air conduit opposite said unit air inlet means, fuel conduits extending between said tank and the anode of each of said fuel cells, a gas exhaust conduit admitting of the release of product gases from each of said electrolyte compartments and from said unit, process air inlet conduits communicating with the cathode of each of said fuel cells and with said central air conduit, process air outlet means in said outer housing communicating with the cathode of each of said fuel cells and with said process air inlet conduits, a direct current electric motor adapted for variable speed operation positioned in said central air conduit and electrically connected with the cells of at least one of said fuel cell packs, a fan rotatably connected with and driven by said motor and adapted to draw atmospheric air through said unit air inlet means and into said central air conduit, force the passage of process air from said central air conduit into said process air inlet conduits and to circulate the remainder thereof as coolant air between said cell packs until the same is exhausted from said self-contained primary power unit, an electrolyte sensor element positioned in one of said electrolyte compartments and associated with an electrical circuit, switching means associated with said electrical circuit whereby the speed of said electric motor is automatically decreased when the electrolyte level in said electrolyte compartment reaches a predetermined level and automatically increased when said electrolyte level falls below said predetermined level, dampering means associated with said process air outlet means for regulating the rate of process air exhaust through said process air outlet means, control means associated with said conduction means and connected with said damper means adapted to control said damper means so that the rate of air exhaust through said process air outlet means is in direct proportional relationship with the rate of electrical current flow through said conduction means, and a pressure actuated coolant air exhaust means in said outer housing adapted to admit of the escape of said coolant air through said outer housing when said speed of said fan is increased.

References Cited in the file of this patent
UNITED STATES PATENTS

| | | |
|---|---|---|
| 1,182,759 | Emanuel | May 9, 1916 |
| 2,980,749 | Broers | Apr. 18, 1961 |
| 3,002,039 | Bacon | Sept. 26, 1961 |
| 3,061,658 | Blackmer | Oct. 30, 1962 |

FOREIGN PATENTS

| | | |
|---|---|---|
| 857,368 | Great Britain | Dec. 29, 1960 |